United States Patent
Thompson

(10) Patent No.: US 8,141,068 B1
(45) Date of Patent: Mar. 20, 2012

(54) COMPILER WITH FLEXIBLE SCHEDULING

(75) Inventor: Carol L. Thompson, San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2194 days.

(21) Appl. No.: 10/175,267

(22) Filed: Jun. 18, 2002

(51) Int. Cl.
*G06F 9/45* (2006.01)

(52) U.S. Cl. ......... 717/161; 717/151; 717/154; 717/159

(58) Field of Classification Search .......... 717/149, 717/159, 153
See application file for complete search history.

(56) References Cited

U.S. PATENT DOCUMENTS

| | | | |
|---|---|---|---|
| 5,202,975 A * | 4/1993 | Rasbold et al. | 717/151 |
| 5,819,088 A | 10/1998 | Reinders | |
| 6,139,199 A * | 10/2000 | Rodriguez | 717/159 |
| 6,367,067 B1 * | 4/2002 | Odani et al. | 717/154 |
| 6,446,258 B1 * | 9/2002 | McKinsey et al. | 717/161 |
| 6,880,153 B1 * | 4/2005 | Thompson et al. | 717/151 |
| 7,010,787 B2 * | 3/2006 | Sakai | 717/159 |
| 7,058,937 B2 * | 6/2006 | Fu et al. | 717/161 |
| 7,073,169 B2 * | 7/2006 | Ogawa et al. | 717/161 |
| 7,082,602 B2 * | 7/2006 | Fu et al. | 717/161 |

FOREIGN PATENT DOCUMENTS

EP 924603 A2 * 6/1999

OTHER PUBLICATIONS

Michael Schlansker et al., "Compilers for Instruction-Level Parallelism," Dec. 1997, IEEE Computer, vol. 30, No. 12, pp. 63-69.*

Bazargan et al., Integrating scheduling and physical design into a coherent compilation cycle for reconfigurable computing architectures, Jun. 2001, pp. 635-640, <http://delivery.acm.org/10.1145/380000/379038/p635-bazargan.pdf>.*

Psarris et al., The impact of data dependence analysis on compilation and program parallelization, Jun. 2003, pp. 205-214, <http://delivery.acm.org/10.1145/790000/782843/p205-psarris.pdf>.*

Zahir, Rumi (Intel Corporation); Morris, Dale; Ross, Jonathan; (Hewlett-Packard Company); Hess, Drew, (Lucasfilm Ltd.); OS and Compiler Considerations in the Design of the IA-64 Architecture; ASPLOS 2000 Cambridge, MA. Nov. 12-15, 2000.

Bala Vasanth (Hewlett-Packard Labs); Rubin, Norman (Digital Equipment Corp); Efficient Instruction Scheduling Using Finite State Automata; 1995 IEEE; pp. 46-56.

(Continued)

*Primary Examiner* — Thuy Dao

(57) ABSTRACT

A computer program consisting of a compiler for compiling source code programs into executable code. The compiler is suited to achieving high efficiency on a processor that can process many instructions at once but the instructions have dependency constraints and the processor has no internal mechanism for dealing with these constraints, such as the Itanium class of processors. As each instruction is considered for addition to a group of instructions for a single cycle, dependencies are checked to determine whether the entire group can be scheduled in any possible order. Once all the instructions of the group have been selected, the instructions are then reordered for placement in a reservation table. For implementation in the Itanium class of processors, detailed requirements of the processor are accommodated with a structure that can be adjusted for any processor in the class. The structure can also be adjusted for other classes of processors.

16 Claims, 12 Drawing Sheets

OTHER PUBLICATIONS

Eichenberger, Alexandre E.; Davidson, Edward S.; A Reduced Multipipeline Machine Description That Preserves Scheduling Constraints; Advanced Computer Architecture Laboratory EECS Department, University of Michigan; PDLI May 1996; pp. 12-22.

Proebsting, Todd A (University of Arizona); Fraser, Christopher W. (AT&T Bell Laboratories); Detectng Pipeline Structural Hazards Quickly; POPL 94—Jan. 1994, Portland Oregon; pp. (280-286).

Intel Itanium Processor Reference Manual for Software Optimization; Nov. 2001; pp. 1-30; Document Number: 245473-003.

* cited by examiner

UNIT TYPE, SLOT NUMBER

| State | M,0 | M,1 | I,1 | I,2 |
|---|---|---|---|---|
| 0 (empty) | 1 | 2 | 3 | 4 |
| 1 (Mxx) | x | 5 | 6 | 7 |
| 2 (xMx) | 5 | x | x | 8 |
| 3 (xIx) | 6 | x | x | 9 |
| 4 (xxI) | 7 | 8 | 9 | x |
| 5 (MMx) | x | x | x | 10 |
| 6 (MIx) | x | x | x | 11 |
| 7 (MxI) | x | 10 | 11 | x |
| 8 (xMI) | 10 | x | x | x |
| 9 (xII) | 11 | x | x | x |
| 10 (MMI) | x | x | x | x |
| 11 (MII) | x | x | x | x |

FIG. 4

(Background Art)

UNIT TYPE, SLOT NUMBER

| State | M0,0 | M,0 | M,1 | I0,1 | I0,2 | I,1 | I,2 |
|---|---|---|---|---|---|---|---|
| 0 (empty) | 1 | 2 | 3 | 4 | 5 | 6 | 7 |
| 1 (M0xx) | x | x | 8 | 9 | 10 | 11 | 12 |
| 2 (Mxx) | x | x | 13 | 14 | 15 | 16 | 17 |
| 3 (xMx) | 8 | 13 | x | x | 18 | x | 19 |
| 4 (xI0x) | 9 | 14 | x | x | x | x | 20 |
| 5 (xxI0) | 10 | 15 | 18 | x | x | x | x |
| 6 (xIx) | 11 | 16 | x | x | x | x | 21 |
| 7 (xxI) | 12 | 17 | 19 | 20 | x | 21 | x |
| 8 (M0Mx) | x | x | x | x | 22 | x | 23 |
| 9 (M0I0x) | x | x | x | x | x | x | 24 |
| 10 (M0xI0) | x | x | 22 | x | x | x | x |
| 11 (M0I) | x | x | x | x | x | x | 25 |
| 12 (M0xI) | x | x | 23 | 24 | x | 25 | x |
| 13 (MMx) | x | x | x | x | 26 | x | 27 |
| 14 (MI0x) | x | x | x | x | x | x | 28 |
| 15 (MxI0) | x | x | 26 | x | x | x | x |
| 16 (MIx) | x | x | x | x | x | x | 29 |
| 17 (MxI) | x | x | 27 | 28 | x | 29 | x |
| 18 (xMI0) | 22 | 26 | x | x | x | x | x |
| 19 (xMI) | 23 | 27 | x | x | x | x | x |
| 20 (xI0I) | 24 | 28 | x | x | x | x | x |
| 21 (xII) | 25 | 29 | x | x | x | x | x |
| 22 (M0MI0) | x | x | x | x | x | x | x |
| 23 (M0MI) | x | x | x | x | x | x | x |
| 24 (M0I0I) | x | x | x | x | x | x | x |
| 25 (M0II) | x | x | x | x | x | x | x |
| 26 (MMI0) | x | x | x | x | x | x | x |
| 27 (MMI) | x | x | x | x | x | x | x |
| 28 (MI0I) | x | x | x | x | x | x | x |
| 29 (MII) | x | x | x | x | x | x | x |

FIG. 5

(Background Art)

Sample 1: List Scheduling: Schedule one cycle at a time, so only need one entry

| | FSM state | Must Shifts | Reorder Map | Dependencies | Issue Unit Count | Instructions | | | | |
|---|---|---|---|---|---|---|---|---|---|---|
| For all cycles (and scheduling models), initial state INITIAL | 0 | 0 | 012345 | 000000 | | | | | | |
| Cycle 0: | | | | | | | | | | |
| ld4 r669=[r698],4 | 263 (M) | 0 | 012345 | 000000 | 90 | | | | | |
| ld4 r676=[r694],4 | 264 (MM) | 0 | 012345 | 000000 | a0 r669=[r698],4 | ld4 | | | | |
| Cycle 1: | | | | | | b0 r669=[r698],4 | ld4 r676=[r694],4 | | | |
| add r677=r669,r676 | 495 (A) | 0 | 012345 | 000000 | add r677 90=r669,r676 | | | | | |
| lfetch [r34] | 400 (MA) | 0 | 102345 | 000000 | a0 r669=r676 add r677 | lfetch [r34] | | | | |
| add r32=8,r34 | 401 (MAA) | 0 | 102345 | 001000 | a0 r669=r676 add r677 | lfetch [r34] | add r32=8,r34 | | | |
| Cycle 2: | | | | | | | | | | |
| dep.z r678=r677,10,22 | 1 (I) | 1 | 012345 | 000000 | dep.z 90 r677,10,22 r678 | | | | | |
| Cycle 3: | | | | | | | | | | |
| add r680=r689,r678 | 495 (A) | 0 | 012345 | 000000 | add r680 90=r689,r678 | | | | | |
| br.ctop L5 | 583 (AB) | 0 | 012345 | 010000 | add r680 90=r689,r678 | br.ctop L5 | | | | |

Figure 8

Sample 2: Modulo Scheduling; Initiation Interval is 2, so need two entries for the two cycles in the loop

| | Cycle | FSM state | Must Shifts | Reorder Map | Dependencies | Issue Unit Count | Instructions | | | | | |
|---|---|---|---|---|---|---|---|---|---|---|---|---|
| INITIAL | | 0 | 0 | 012345 | 000000 | | | | | | | |
| | | 0 | 0 | 012345 | 000000 | | | | | | | |
| 1:1 br.ctop L5 | 0 | 0 | 0 | 012345 | 000000 | 90 | | | | br.ctop L5 | | |
| | | 1 612 (B) | 0 | 012345 | 000000 | 90 | | | | br.ctop L5 | | |
| 0:1 ld4 r669=[r698],4 | 0 | 283 0(M) | 0 | 012345 | 000000 | 90 | | | a0 r669=[r698],4 | br.ctop L5 | | |
| | | 1 612 (B) | 0 | 012345 | 000000 | 90 | | | | br.ctop L5 | | |
| 0:2 ld4 r676=[r694],4 | 0 | 284 0(MM) | 0 | 012345 | 000000 | 90 | | ld4 r676=[r694],4 | b0 r669=[r698],4 | br.ctop L5 | | |
| | | 1 612 (B) | 0 | 012345 | 000000 | 90 | | | | br.ctop L5 | | |
| 1:2 add r677=r669,r676 | 0 | 284 0(MM) | 0 | 012345 | 000000 | 90 | | ld4 r676=[r694],4 add r677 =r669,r676 | b0 r669=[r698],4 | br.ctop L5 | | |
| | | 583 1(AB) | 0 | 102345 | 000000 | 90 | | | | br.ctop L5 | | |
| 2:4 dep.z r678=r677,10,22 | 0 | 87 0(IMM) | 1 | 120345 | 000000 | 90 | dep.z r678 =r677,10,22 | ld4 r676=[r694],4 add r677 =r669,r676 | b0 r669=[r698],4 | br.ctop L5 | | |
| | | 583 1(AB) | 0 | 210345 | 000000 | 90 | | | | br.ctop L5 | | |
| 1:4 lfetch [r704] | 0 | 87 0(IMM) | 1 | 120345 | 000000 | 90 | dep.z r678 =r677,10,22 | ld4 r676=[r694],4 add r677 =r669,r676 | b0 r669=[r698],4 | br.ctop L5 | | |
| | | 459 1(MAB) | 0 | 210345 | 000000 | 90 | lfetch [r704] | | | br.ctop L5 | | |
| 1:8 add r706=8,r704 | 0 | 87 0(IMM) | 1 | 120345 | 000000 | 90 | dep.z r678 =r677,10,22 | ld4 r676=[r694],4 add r677 =r669,r676 | b0 r669=[r698],4 | br.ctop L5 | | |
| | | 433 1(MAAB) | 0 | 310245 | 001000 | 90 | lfetch [r704] | | | br.ctop L5 | add r706 =8,r704 | |
| 3:16 add r680 =r689,r678 | 0 | 87 0(IMM) | 1 | 120345 | 000000 | 90 | dep.z r678 =r677,10,22 | ld4 r676=[r694],4 add r677 =r669,r676 | a0 r669=[r698],4 | br.ctop L5 | add r706 =8,r704 | |
| | | 415 1(MAAA) | 0 | 410235 | 001000 | 90 | lfetch [r704] | | | br.ctop L5 | add r706 =8,r704 | add r680 =r689,r678 |

Sample 4: Rescheduling (List Scheduling)

| | FSM state | Depend-encies | stateInfo Index | Issue Unit Count | Must Shifts | possible Start Slots | canonical Reorder Map | | | Instructions | | |
|---|---|---|---|---|---|---|---|---|---|---|---|---|
| For all cycles (and scheduling models), initial state: INITIAL | 0 | 000000 | 0 | | | | 012345 | | | | | |
| Cycle 0: ---EmptyOp--- | 0 | 000000 | 0 | 90 | 0 | 0 | 012345 | | | | | |
| add r6=@ltoff(b),gp | 495 (A) | 000000 | 3070 | 90 | 0 | 0 | 012345 | add r6 =@ltoff(b),gp | | | | |
| alloc r32 =ar.pfs,0,4,1,0 | 400 (AA) | 0100000 | 2465 | 90 | 1 | 0 | 102345 | add r6 =@ltoff(b),gp | alloc r32 =ar.pfs,0,4,1,0 | | | |
| mov r33=rp | 145 (IMA) | 202000 | 907 | 94 | 3 | 0 | 210345 | add r6 =@ltoff(b),gp | alloc r32 =ar.pfs,0,4,1,0 | mov r33=rp | | |
| add r35=0,rp | 146 (IMAA) | 202200 | 925 | 94 | 3 | 0 | 210345 | add r6 =@ltoff(b),gp | alloc r32 =ar.pfs,0,4,1,0 | mov r33=rp | add r35=0,rp | |
| add r10=0,r0 | 147 (IMAAA) | 202220 | 943 | 94 | 3 | 0 | 210345 | add r6 =@ltoff(b),gp | alloc r32 =ar.pfs,0,4,1,0 | mov r33=rp | add r35=0,rp | add r10=0,r0 |

Figure 11

COMPILER WITH FLEXIBLE SCHEDULING

BACKGROUND

Computer processors are comprised of several processing units each dedicated to processing a type of instructions. For example, FIG. 1 shows a simple processor with four processing units marked I, M, F, and B. The I unit can process instructions of the I type; the M unit can process instructions of the M type; the F unit can process instructions of the F type; and the B unit can process instructions of the B type. Each type of instructions can comprise any number of different instructions, typically between 20 and 80. The processor shown in FIG. 1 can process four instructions at one time in a single cycle of the processor, one from each instruction type, one in each of the processor units shown in FIG. 1.

A compiler is a computer program that, when run on a computer, causes the computer to receive as input the "source code" instructions of a second computer program (an "application program") written by a programmer to perform a particular set of tasks (an "application"). To write such an application, programmers prefer to use a "high-level" language which allows them to write generalized logic instructions, leaving it up to the compiler program running on the computer to work out the details of how to instruct a particular processor to accomplish all of the steps required. The compiler program therefore translates the programmer's high-level language source code program instructions into specific detailed instructions, called "object code" or "executable code", for execution on a processor and assembles the instructions into a particular sequence with a particular "schedule" that determines which instructions are to be executed in which cycle.

FIG. 2 shows a processor of greater complexity that includes multiple units of each unit type such as processors implementing the Intel® Itanium® architecture. If the units of each type are functionally identical, they can process any instruction of that type. That is, if unit I0 is the same as unit I1, each of them can process any instruction of the I type. Similarly, if units M0 and M1 are functionally identical, each of them can process any instruction of the M type. The same applies for the F units and the B units as shown in FIG. 2.

The compiler can instruct the processor to execute the object code instructions one at a time, each instruction using a processor unit as appropriate to the instruction type. However, the program will run much faster if multiple instructions can be executed on the processor at the same time, each in a different unit of the processor. When there are large numbers of instruction types (seven is now typical) or large numbers of units in the processor (12 is now typical), the possibilities for scheduling the detailed instructions for the processor become quite complex. There are thousands of different ways to schedule the detailed object code instructions for even a very simple application program, and some of these possible schedules will run faster than others. Furthermore, certain schedules that would seem logically possible will create conflicts because some instructions will create dependencies for other instructions such that they must be performed in a certain order to work properly. In addition, some processors, such as those of the Itanium® class, will also require that two instructions to be processed together in a single cycle in different units be presented to the processor in a certain left-right order, that certain instructions within a group come first, and that certain instructions within a group come last. Thus, the scheduling problem for contemporary processors is exceedingly complex.

So that a compiler program running on a computer can automatically determine an appropriate schedule for the object code instructions, the compiler program has within it a computer "model" of the processor. This model is designed so that schedules of instructions that will correctly function can be determined by using the computer model of the processor. As the model considers instructions to be issued to the processor, they are identified as falling into "issue unit" types. These types are designed to generally correspond to the processor unit types. However, for implementation for a contemporary complex processor, the correspondence is not exact to improve the model's ability to manage special rules for the processor units. The model then works with issue units, each of which is a class of instructions that are functionally equivalent for the model's purposes.

A common method for modeling a processor in a compiler program use either a "reservation table" or a "finite state machine" ("FSM", also called a "finite state automaton") or both together. In a finite state machine, the model contains one "state" for each possible configuration of issue units for the processor. Each state fully defines the issue units that can be submitted to the processor at one time and includes an indication of each of the other states (as represented by the model) to which a transition can be effected from the present state without violating any of the state transition rules specified by the model for that processor. FIG. 3 shows a representation of a finite state machine. The binary numbers inside each circle describe the state, and arrows indicate each permissible transition, including, where permitted, a transition back to the same state.

A state machine can be represented as a state table. FIG. 4 shows a representation of a state table for a hypothetical simple processor. This processor has two unit types, I and M. For FIG. 4, there are two issue units of each type. To keep the example simple and, at the same time, typical of actual processors, this hypothetical processor can receive only three instructions at a time (even though it has 4 units) and each group of 3 instructions must be ordered such that it has an M instruction in the left-most position ("slot"). This means that each group of issue units allowed by the model will be (MMI) or (MII) or a subset of these possibilities with one or two empty slots. The left column in FIG. 4, labeled "State", lists all eleven of the possible sets of issue units, each with a state number. The second column, labeled M/0, lists the subsequent state to which the state machine transitions if it receives an instruction of issue unit type M for slot 0 (the left-most of the three slots). The third column, labeled M/1, lists the subsequent state to which the state machine transitions if it receives an instruction of issue unit type M to be placed in slot 1 (the center of the three slots). Because an I type instruction can not go in the left-most slot, slot 0, the fourth column is labeled I/1. Similarly, the fifth column is labeled I/2.

When the state machine is in a particular state and it can receive one of two types of instructions, each of which can go in one of two types of slots, the four possibilities are represented by a row in the state table as shown in FIG. 4. If an x is shown in a column, this means the state machine can not receive such an instruction. If a number is shown, this means the state machine can receive the instruction and then transition to the state represented by the number.

If a processor has multiple units of each type as shown in FIG. 2, a state table like FIG. 4 can be used without causing undue complexity because each processor unit of a type is interchangeable with each of the other units of that type. That is, because any I type issue unit can be executed in any I processor unit and any M type issue unit can be executed in any M processor unit, simply having multiple I type units or multiple M type units does not increase complexity for the state table.

However, processors have now been developed where, within a processor unit type, one of the units can process the set of the regular instructions, like all of the other units of that type, plus it can process certain specialized supplemental instructions (a superset of instructions) that can only be processed in that particular unit and not in any other unit of that type. For purposes of this document, the additional instructions are called "supplemental" instructions. The supplemental instructions are referred to as "must-shift" instructions and information which tracks whether an instruction is a supplemental instruction is referred to as "must-shift" information. The Itanium class of processors developed by Intel Corporation is an example of a processor with multiple units of each of several types where, within a unit type, one of the units can process regular instructions plus supplemental instructions while the other units of that type can only process regular instructions.

Under the approach that has heretofore been taken for use of a finite state machine model in a compiler program, to accommodate this type of processor, one increases the number of columns in the state machine for each instruction type with supplemental instructions and greatly increases the number of states. For example, assume that, of the processor units described for FIG. 4, the 0 units (I0 and M0) are the units that can process the supplemental instructions in addition to the regular instructions and the I and M units cannot process the supplemental instructions. This means that two regular M instructions can be processed at one time (or two regular I instructions) but only one of two M instructions (or I instructions) can be a supplemental instruction.

As is known in actual processors, assume further that, whenever two instructions of a type are sent and one of them is a supplemental instruction, the processor requires that the order in a group of instructions to be executed in one cycle have the supplemental instruction left of the regular instruction. In the example of FIG. 4, this means that an M0 type instruction (issue unit) must go in the left most slot (slot 0) of an issue group, an M type instruction can go in slot 0 or slot 1, an I0 instruction can go in slots 1 or 2, and an I type instruction can go in slots 1 or 2 but never to the left of an I0 instruction. As shown in FIG. 5, this requires seven columns in the state machine, M0/0, M/0, M/1, I0/2, I0/2, I/1, and I/2. (This is one column less than a full doubling of the number of columns in the state machine of FIG. 4 because, for this hypothetical processor, M0 instructions can go only in the left-most slot.) In addition, many more states are required. FIG. 5 has nearly three times the number of states of FIG. 4, for a total size increase of more than 4 times. For the particular hypothetical processor represented by FIG. 5, many of the states are equivalent, so the number of states can be reduced, but it is still significantly larger than the state table of FIG. 4.

Large state machines are undesirable for a processor model in a compiler for today's complex processors. The present invention presents a superior solution to this problem.

SUMMARY OF THE INVENTION

The Present invention allows a large number of possibilities of instruction ordering within an issue group, and avoids imposing unnecessary ordering constraints between instructions as they are selected for scheduling, to achieve very high efficiency on a processor that can process many instructions at once but have considerable dependency constraints and no internal mechanism for dealing with these constraints, such as the Itanium class of processors. The present method includes the ability to reorder a group as it is being scheduled. The method is achieved by creating a "dependency vector" that represents all of the dependencies between any set of instructions that have been selected for an issue group. The dependency vector data is stored in a memory. When another instruction is considered for addition to the group, information associated with that instruction is processed with the existing dependency vector data to generate a new dependency vector. Then the new dependency vector is checked against the model to determine whether any possible ordering of the instructions with the newly proposed instruction will satisfy the model. If there is an order that will satisfy the model, the instruction is added to the current issue group.

As each additional instruction is considered for addition to a group, all of the previously selected instructions for the group can be further reordered if that will allow the new instruction to be included and still achieve an order that will satisfy the model. That is, although some instructions have been selected, they are not scheduled until all instructions for the group have been selected and found compatible. Consequently, the schedule remains flexible until the last instruction is added to the group. Even after a few instructions have been selected, their slots within the issue group are not fixed. The slots can be further reordered by a subsequent step in the process if that will allow another instruction to be added to the group and still satisfy all of the dependencies.

For a processor with an issue width of six (six instructions in each issue group), the dependency vector is computed a minimum of five times for each issue group. Because the relative order of instructions isn't fixed at the time each instruction is selected, and because it would cause the model to run too slowly if it included all possible orderings of instructions, the instructions are assumed by the model to be in a "canonical" ordering by issue unit type. However, the scheduler considers the instructions in the order in which they are scheduled. Therefore a data record is maintained which reflects the reordering that is required to transform the scheduled order to the canonical order for comparison to the model. This data record is a reorder map and is associated with the reservation entry for the current issue group. The dependency vector must also reflect the canonical order (as that is what the model can work with), while the scheduler computes dependencies in terms of the original scheduled order. Therefore, the dependencies must also be reordered to reflect the canonical order before being added to the dependency vector. However, because the reservation entry reorder map is a simple array, and the dependency vector is a bit-mask, these transformations from scheduled order to canonical order are modest compared to the computational complexity of selecting instructions for scheduling.

A similar reorder map data record is associated with each state in the finite state machine portion of the model, to indicate the reordering required to place the instructions in their final ordering, according to the current state. Once the final set of instructions is selected for the group, this state reorder map is used to schedule the instructions into the reservation table in the proper order.

The invention may be implemented with any model in the compiler, whether or not the model uses a finite state machine. If a finite state machine is used, the validity of a transition from one state to another may be determined by calculating the dependency vector for the new instruction proposed to be added to the issue group. In one embodiment, as described below in the detailed description section, a state machine may be used where each state includes a standard (canonical) ordering of the instructions for the issue group that are specified by that state. The state reorder map then specifies reordering relative to the canonical ordering.

In one aspect, the invention is computer software on a storage medium such as a disk, the software comprising a compiler program which, when run on a computer, causes the computer to: (a) select, from a set of instructions, a first instruction and a second instruction to be issued to the processor in an issue group, (b) generate dependency data reflecting dependencies between the first and second instructions, (c) determine whether the dependency data, for any possible order of the instructions, satisfies a model within the compiler, (d) if the dependency data satisfies the model, proceed to the last step and, if not, reject the second instruction, select an alternate second instruction from the set of instructions, and return to step c, (e) store the dependency data for the first and second instructions in a memory, (f) select a third instruction from a set of instructions, (g) read the dependency data from the memory and update the dependency data to reflect dependencies between the first, second, and third instructions, (h) determine whether the dependency data, for any possible order of the instructions, satisfies the model, (i) if the dependency data satisfies the model, proceed to the last step and, if not, reject the third instruction, select an alternate third instruction from the set of instructions, and return to step g, and (j) once all instructions for the group have been selected and approved, reorder the instructions in the issue group to an order that satisfies the model.

In another aspect, the invention is a method to be performed on a computer for executing the process described above. In yet another aspect, the invention is a computer system with means for performing the compiling process described above.

For one embodiment of the invention for the Itanium® class of processors, a data structure for the dependency vector and the state reorder map is shown in FIGS. 6 and 7. In this embodiment, each state in the state machine specifies a group or a part of a group of instructions (issue units within the model) to be issued together for a single cycle of the processor. For the Itanium® class of processors, six instructions can be issued in a group for a single cycle, so each state in the state machine has six "slots".

As shown in FIG. 6, each state 60 in the finite state machine is represented as an integer that indexes into a StateInfo Index Table 61. The StateInfo Index Table provides indexes into the StateInfo Table 62. The StateInfo Table contains many records, more than one of which can be relevant to a single state in the finite state machine. As shown in FIG. 6, the index from the StateInfo Index Table points to a StateInfo record 64 in the StateInfo Table. All subsequent StateInfo records up to, but not including, a StateInfo record 66 pointed to by the next entry in the StateInfo Index Table are all associated with the given state 60 in the state machine.

As shown in FIG. 7, each StateInfo record 71 is comprised of five fields 71-75. FIG. 7 shows five fields within the StateInfo record: dependency vector 71, must-shift 72, start slot 73, reorder index 74, and templateId 75, which are used cooperatively to implement other features of the model for the Itanium class of processors. These are described in detail in the Detailed Description section below.

BRIEF DESCRIPTION OF THE DRAWINGS

FIG. 4 shows a finite state machine represented as a table.

FIG. 5 shows a finite state machine table for a processor that can process supplemental instructions as well as regular instructions, represented as a table.

FIG. 8 shows an example of list scheduling.

FIG. 9 shows an example of modulo scheduling.

Figure 10A:
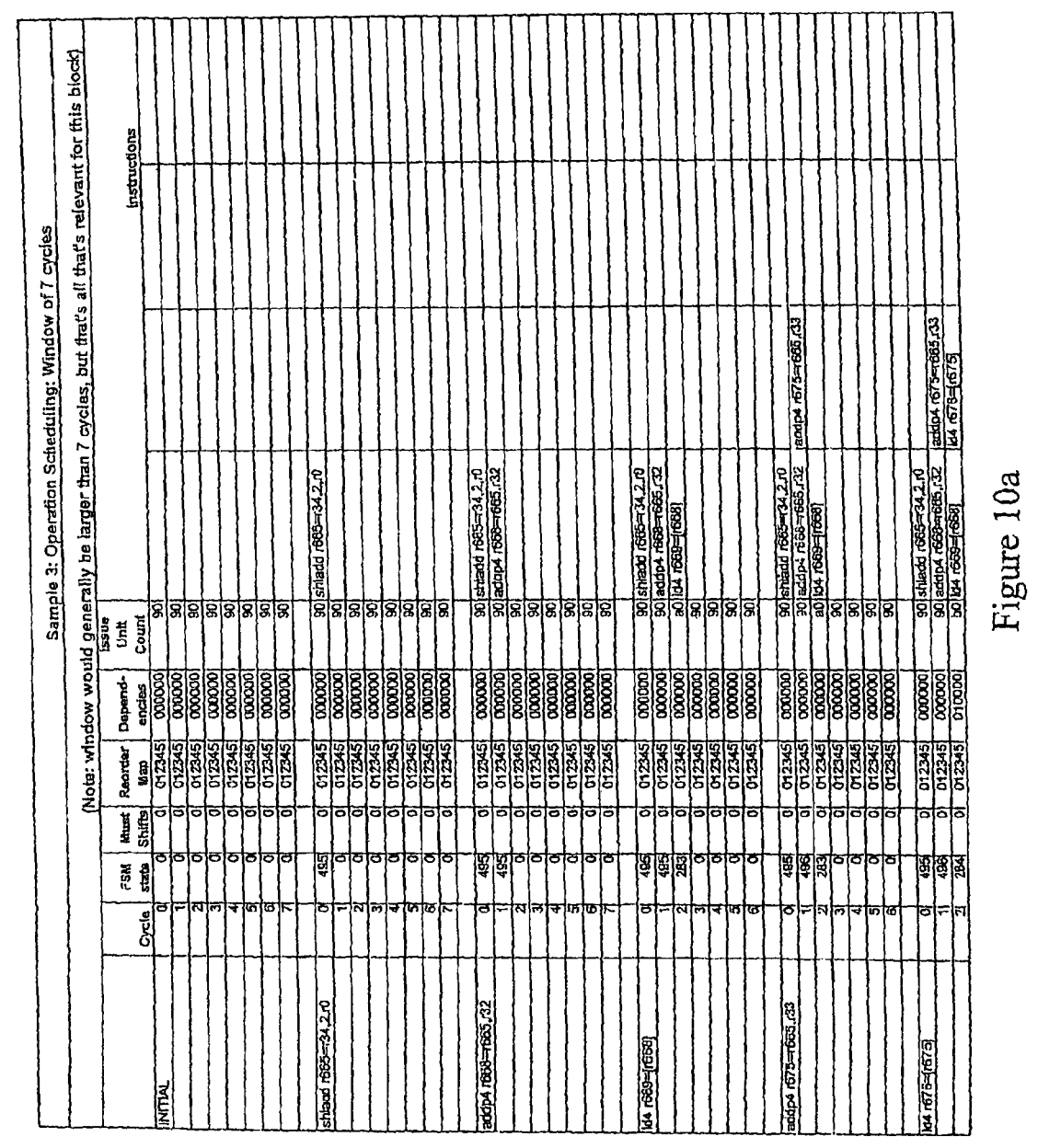
Figure 10B:
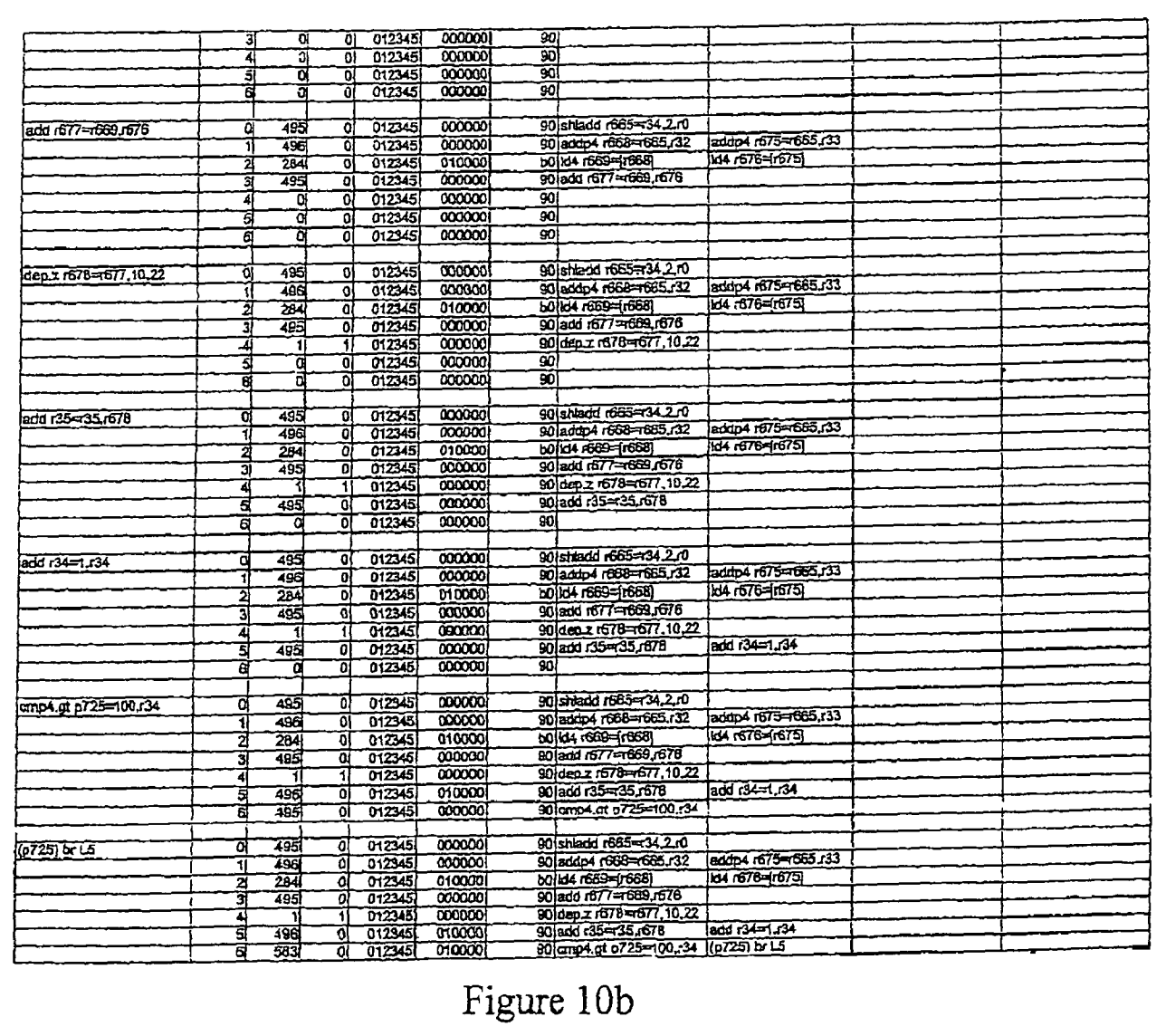

FIGS. 10a and 10b show an example of operations scheduling.

FIG. 11 shows an example of list scheduling for rescheduling.

DETAILED DESCRIPTION

1 Overview

Figure 1:
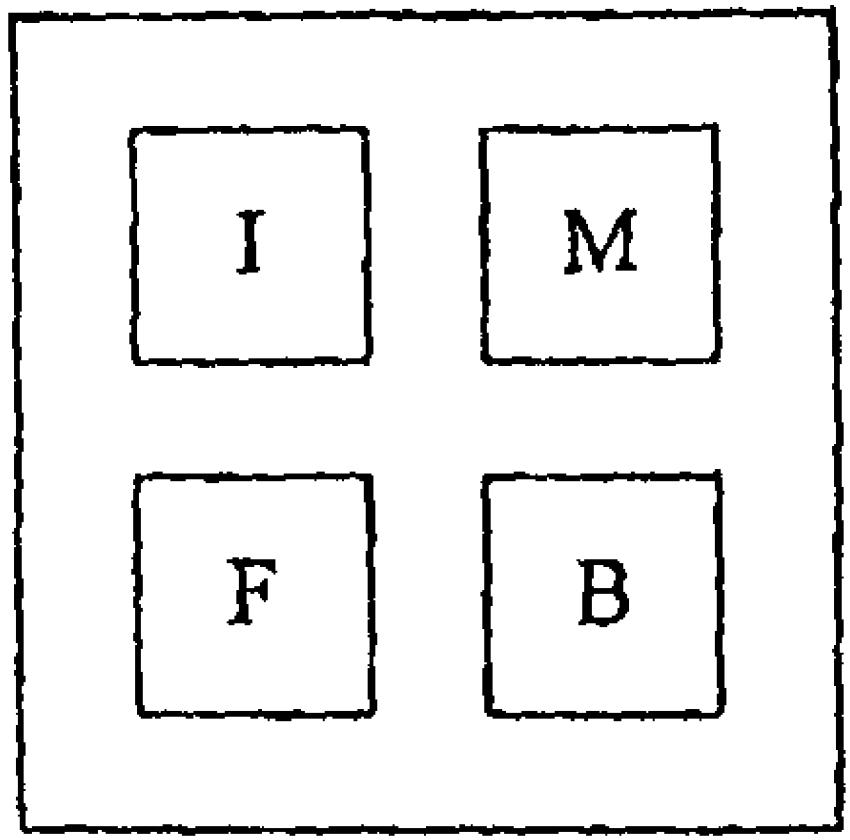
FIG. 1 shows a simple hypothetical processor with one unit of each type.
Figure 2:
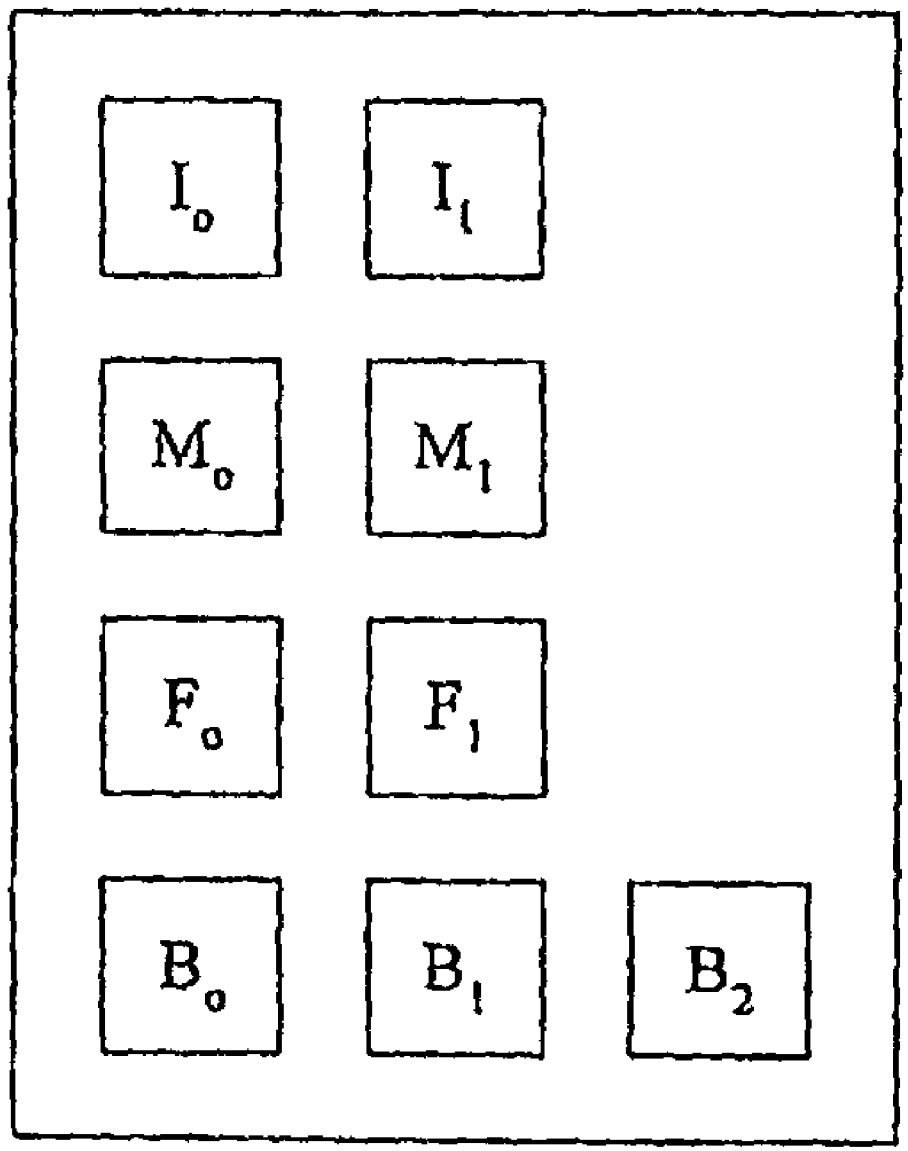
FIG. 2 shows a hypothetical processor with multiple units of each type.
Figure 3:
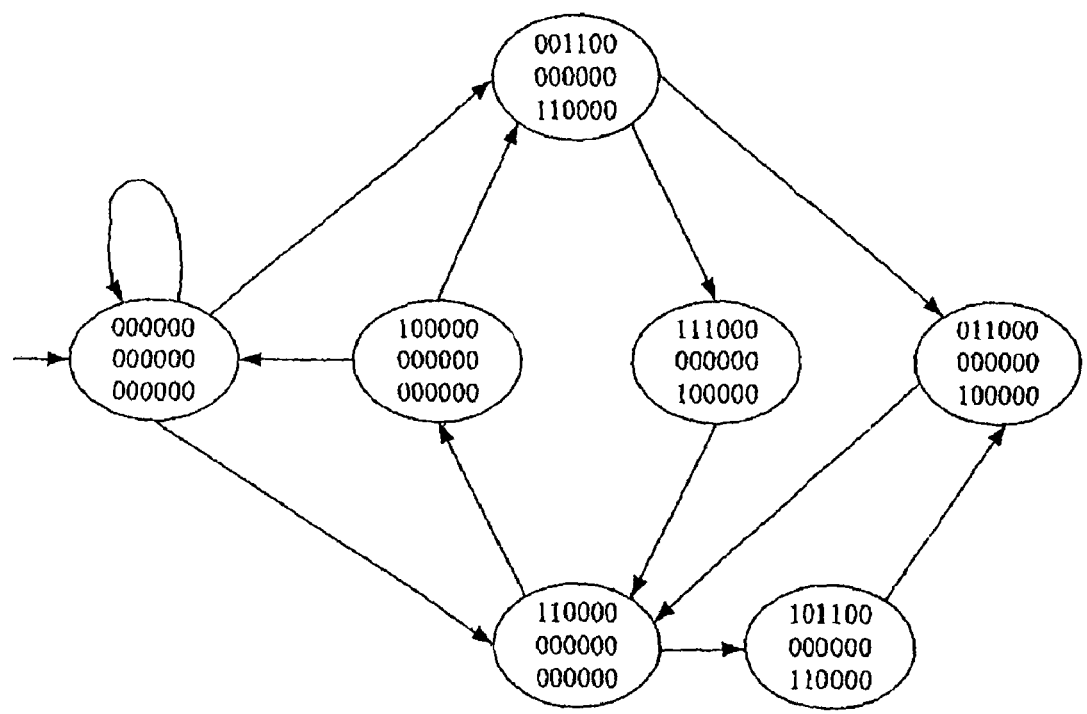
FIG. 3 shows a schematic diagram of a finite state machine.

The disclosed model is an abstraction of the resource, issue and bundle constraints of the Itanium Architecture IA-64 implementations. A ReservationTable is used by the instruction scheduling components (list, operation, and modulo scheduling) to track where the instructions have been scheduled, along with intra-cycle dependencies.

The important considerations for the model include the supported templates (which specify the allowable orderings of instructions, by issue unit type), the must-shift (supplemental) instructions, the A-unit instructions (which may go into M or I slots) and the must-be-first, and must-be-last instructions. Since the instructions do not appear in the same order in all of the templates, and because of the various constraints on instruction order, it is desirable to delay any decisions on absolute instruction placement or relative ordering as long as possible.

2 Slots and ScheduleTimes

The Slot type represents a slot within an issue group for a cycle as a single bit in an unsigned 8-bit integer. The motivation for this representation, rather than a simple integer, is to enable us to represent multiple dependencies as the union (or) of their slot values, as in the Must-Shift slots 72 in FIG. 7. There is also a notion of a "slot index" which is a simple enumeration of the slots. The Slot value is always (1<<slotIndex).

The ScheduleTime class contains a cycle and slot, and represents the time at which an instruction was scheduled, or the early or late constraints for a possible schedule time, the latter incorporating information about dependencies on previous instructions.

3 Issue Units

The term "instruction" as used above is referred to below as an "IssueUnit", which term refers to templates for instructions in an issue group as well as the instructions themselves. There is a single IssueUnit enum which contains all of the IssueUnit types supported. Some apply only to Itanium (F0) and some apply only to McKinley (M2, MS, and ML). Some of the IssueUnit types supported are considered "template issue units" in that they appear in the templates. The reason for the distinction is to simplify the finite state machine.

4 Machine State

The state of a given cycle in the ReservationTable is updated and tracked using a finite state machine, along with auxilliary data structures (including must-shift field within the stateInfoTable, state reorderMap, and dependency vector)

to handle intra-1 cycle dependencies, must shifts, other specialized units (e.g. ML and MS on McKinley), and possible starting slots.

The finite state machine is quite simplistic. Each FSMState represents a set of template issue units, in a canonical ordering. The transitions are represented as a two-dimensional array, indexed by the current FSMState and the issue unit to be added. Each array element contains the new FSMState (or NoFSMState if it is not a legal transition), and the possible positions for the new issue unit in the canonical ordering. There may be multiple possible positions if the state already contains issue units of the same template type. Although the FSMState only models template issue units, the transition table is indexed by all issue unit types. Must-shift issue units are always inserted in front of any other issue units of the same template type.

Figure 6:
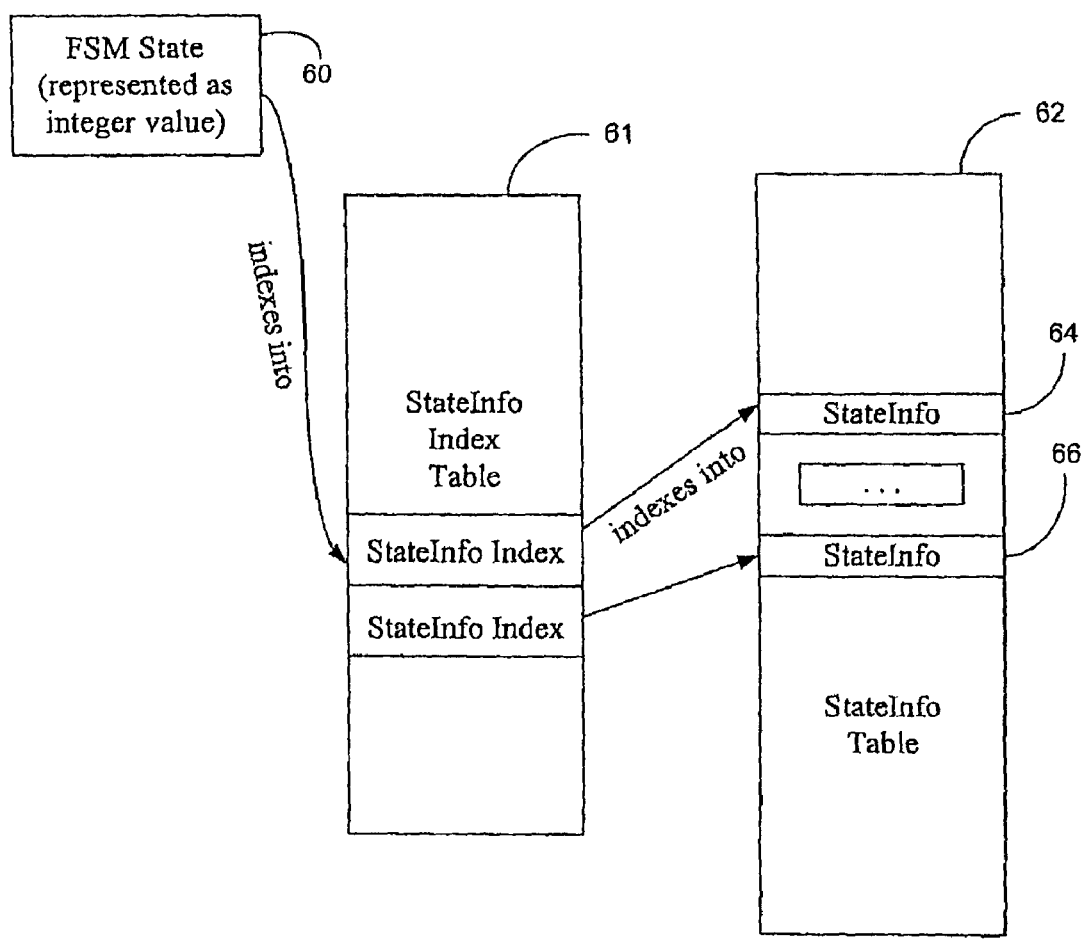
FIG. 6 shows an auxiliary data structure which is pointed to by a state in the state machine containing information whether a particular slot in an issue group can receive a must-shift (supplemental) instruction.
Figure 7:
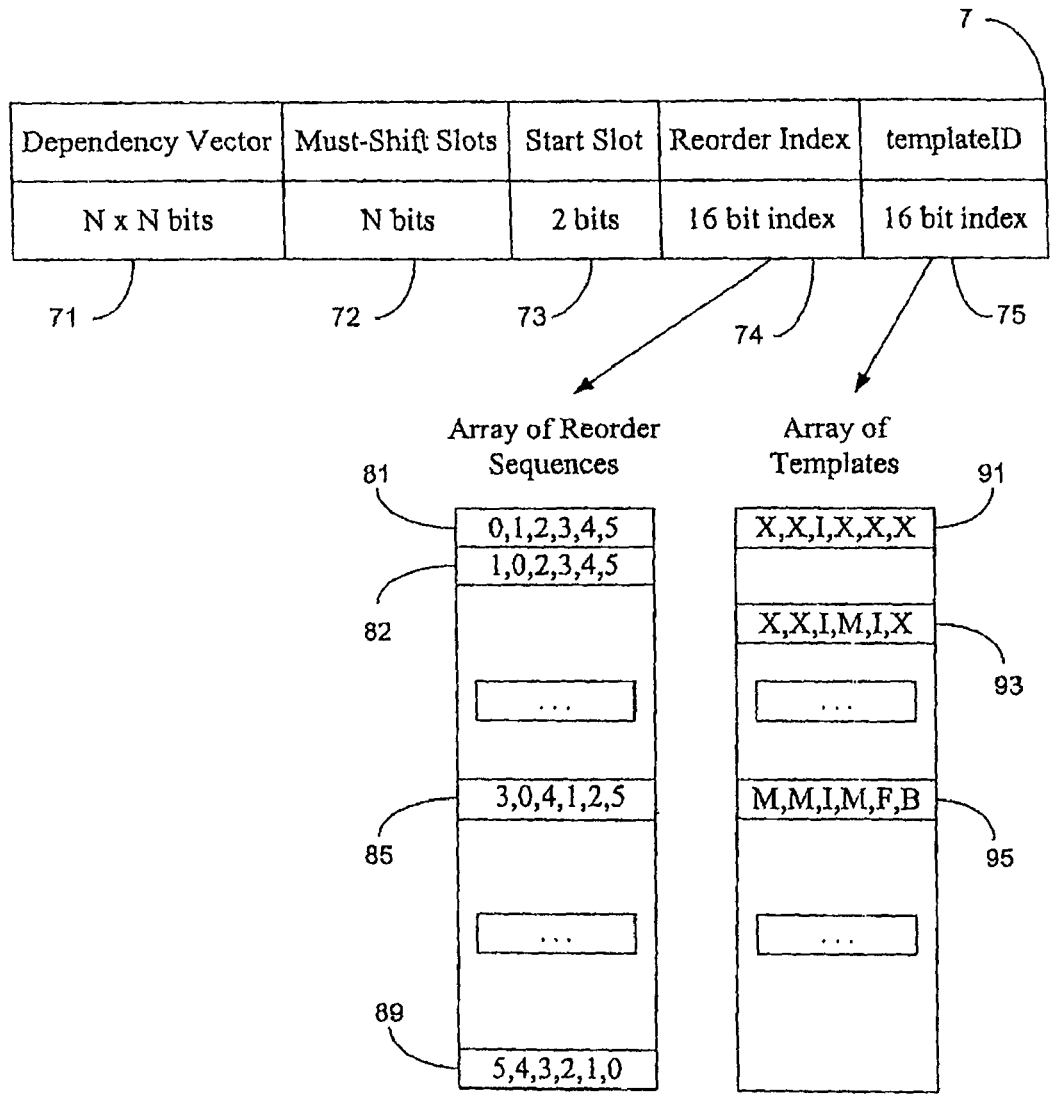
FIG. 7 shows the structure of each record of the StateInfo Table of FIG. 6.

For each FSMState, there may be several legal orderings of the issue units within an issue group, each of which has a different associated dependency vector, starting position, and must-shift slots. As shown in FIG. 6, these are effectively sub-states of the FSMState, and are kept in a stateInfoTable 62. A separate stateInfoIndex 61 maps from FSMState 60 to the stateInfoTable for its first sub-state. A new state is considered valid only if there is a valid FSMState transition, and a stateInfo entry (i.e. sub-state) 64-66 satisfying the required dependencies, must-shifts and start slot. As shown in FIG. 7, each of these stateInfo entries also contains an index 74 into a state ReorderMap 81-89, which maps from the canonical ordering corresponding to the FSMState, to the final issue order, as well as the template indices 75, each of which points to a template 91-95 for the possible end slot values. In the case of Itanium class processors, there are two additional templateId fields, not shown, for a total of three, because there are three possible end-slot values.

4.1 MachineState

The MachineState represents the type of instructions scheduled into a particular cycle, along with their interdependencies. There are several components to the state:

The FSMState 60 (finite state machine state) represents the "template issue units" which have been scheduled so far. The template issue units are those which are actually specified in the Itanium System Architecture (I, M, A, F, B, H, and L). The H unit is not actually specified in the Itanium System Architecture, but is used for branch hints, which otherwise require awkward special handling. This part of the MachineState doesn't convey any information about intra-cycle dependencies or special units, such as I0.

The DependencyVector 71 represents the dependencies between instructions in the cycle (see section 4.2).

The stateInfoIndex 61 is an index into a table of possible sub-states of the current FSMState. See section 4.1.1.

The issueUnitCount, which indicates the count of non-template instruction types, which are not automatically limited by the templates. This doesn't apply to I0 (or F0 on Itanium 1), since there is only one instruction allowed per cycle, and the allowed location is indicated by the must-shift position. However, on McKinley, there are a number of different specialized M-units (and two possible must-shift M's per cycle), and we use this count to ensure that we haven't exceeded the count for any one unit. These counts are packed into a single word, and organized such that we can detect an overflow by checking against an overflow mask. We do this by initializing the count for each unit to a power of two minus the maximum count. In the model for the McKinley processor, the following issue unit maps exist:

M0Map 0x1 (overflow in bit 0x2)
M2Map 0x4 (overflow in bit 0x8)
MLMap 0x10 (initialized to 0x10; overflow in bit 0x40)
MSMap 0x80 (initialized to 0x80; overflow in bit 0x200)

The mustShifts scheduled in the current cycle. These are expressed as the slot positions in the canonical order which contain must-shift instructions.

The possibleStartSlots. This represents the start slots which are allowed for the current cycle. In the CycleReservationTable, this is set by the scheduler based on the possible ending slots for the previous cycle

4.1.1 StateInfoTable

As shown in FIG. 6, the stateInfoTable contains a number of entries 64-66 for each FSMState value 60. Each of these can be considered to correspond to a sub-state of the FSMState. Each of these sub-states corresponds to a specific ordering of the issue units, which is realizable with a valid template. As shown in FIG. 7, each sub-state has the following information associated with it:

The DependencyVector 71 representing the dependencies supported by the current sub-state The slots in the sub-state which can accommodate must-shift instructions (e.g. I0, M0, etc) 72

The starting slot of the associated template(s) 73.

The reordering to apply 74, to obtain the final issue order. This reordering is relative to a canonical ordering of the issue units.

An array of template numbers 75, one for each possible end slot, indicating the template to use for this state if it becomes final.

4.2 DependencyVector

As shown in FIG. 7, the DependencyVector (FSMTypes.h) 71 is expressed as a 64-bit integer, of which only the low-order 36 bits are relevant for a processor with an issue width of 6 such as Itanium. There is a 6-bit mask for each slot index, with the lowest order 6-bit mask corresponding to the first slot index (0). Each bit (if set) represents a dependency between the instruction in the slot corresponding to the bit and the instruction corresponding to the 6-bit mask. This allows us to represent any ordering constraints between instructions, without committing any instruction to a specific slot. For example, the following DependencyVector represents forced left-to-right ordering (it's represented in octal, to make it easier to discern the 6-bit fields):

0371707030100

There are a number of functions defined to operate on DependencyVectors:

addDependency (DependencyVector &d, UInt x, UInt y): adds a dependency from slot index x to slot index y.

checkDependency(DependencyVector &d, UInt x, UInt y): returns TRUE if there is a dependency from x to y, FALSE otherwise.

getDependencies(DependencyVector &d, UInt y): returns the 6 bit mask of dependencies from other slot indices to y.

setDependencies(DependencyVector &d, UInt y, UInt8 newDeps): sets to newDeps the 6-bit mask of dependencies to y.

copyDependencies(DependencyVector &source, DependencyVector &target)

anyOutDependencies(DependencyVector &source, UInt x)(used only for modulo scheduling): returns TRUE if there are any dependencies from x to other slot indices, FALSE otherwise.

insertDependencies(DependencyVector &d, UInt index, UInt8 newDeps): This function implements the insertion of a new instruction at the given index. All dependencies are adjusted to bump up the slot indices of the given index or larger.

deleteDependencies(DependencyVector &d, UInt index):
This function implements the deletion of an instruction at the given index. All dependencies are adjusted to decrement the slot indices of larger than the given index.

4.3 Canonical Order

The canonical order for the instructions has them in ascending template issue unit order. Although the ordering of instructions of different template types is constrained only by the dependency vector, the ordering of instructions within a template unit (e.g. different M types) is fixed. When an instruction is scheduled, its position in the "canonical order" may be flexible (i.e. if there are already instructions of the same template issue unit type in the same cycle). Must-shift instructions will always be inserted before other units of the same type. This ensures that the must-shift instructions will be issued first:

- If we have multiple instructions of the same type with interdependencies, we have to make sure that we insert a new instruction in a position that accommodates those interdependencies. We don't try all possible reorderings, and therefore there may be cases where we could theoretically schedule an instruction, but won't be able to.
- On McKinley, if we have both an M0 and an M2, their relative order will depend only upon which has been scheduled first. If the M0 is scheduled first, and happens to be an alloc, we won't schedule the M2 in the same cycle, since it can't be inserted in front of a "must be first" instruction. This is overly conservative since the M2 could have been scheduled after the alloc. Note that on McKinley, the ML and MS instruction types are not must-shifts, and they are freely reordered, subject only to their dependencies.

4.4 MachineModel::getNewState( )

This function is called when an instruction is scheduled, and it computes the updated MachineState for the scheduling of the given instruction, if it can be scheduled. Otherwise, it returns a MachineState value with FSMState set to NoFSM-State.

In addition to the MachineState, the reorderMap (mapping from the scheduled slot index to the canonical slot index) may be affected by the scheduling of a new instruction. This is passed in to MachineModel::getNewState as a reference parameter, but is only updated if the Boolean update parameter is TRUE.

The arguments to MachineModel::getNewState( ) are as follows:

- IssueUnit thisUnit: the issue unit of the instruction being scheduled.
- UInt slotIndex: the slotIndex of the instruction being scheduled. Note that the ReservationTable puts a newly scheduled instruction into the next available slot, but this doesn't have any ordering implications. This function needs this index to appropriately construct the new dependency vector and reorderMap.
- UInt8 toDeps: the dependencies to this instruction from other instructions in the same cycle. Note that these are represented as a union (or) of the slots of the instructions having dependencies to this one.
- UInt8 fromDeps: the dependencies from this instruction to other instructions in the same cycle. Note that these are represented as a union (or) of the slots of the instructions to which this one has dependencies. (Note also that this will always be zero during list scheduling, since instructions are scheduled in forward order).
- MachineState curState: the current MachineState (before scheduling this instruction).
- Order &reorderMap: the current reorderMap. This expresses the reordering from the scheduled order (i.e. the slot indices as reflected in the ReservationTable) to the canonical order. This is a reference parameter, and is updated if the new state is valid, and the update parameter is TRUE.
- Boolean update: TRUE iff the reorderMap should be updated.

First, we compute the newIssueUnitCount, to determine whether we've exceeded any limits on non-template issue units (McKinley's M0, M2, ML, and MS units).

If we haven't overflowed the issue unit count, we obtain the newFSMState from the transition table, which also contains the first and last positions available for insertion of the current instruction. The difference between the first and last position indicates how many instructions there are of the same template issue unit. We can insert anywhere in this range. We prefer to start at the end of the range, so that we're not trying to displace any must-shifts (if this is a must-shift, its range will reflect that). We pick the latest position which accommodates the dependencies, if any. Note that if there are no "fromDeps", we can just use the last position. We may need to swap instructions of the same template issue unit to accommodate the dependencies, since the relative order of instructions of the same template issue unit is fixed.

If there are "fromDeps" (dependencies from this instruction), we move this instruction before any dependent instructions of the same template issue unit. This may then interfere with instructions having dependencies to this instruction ("toDeps"), which we then move before this instruction.

Note that we don't do swapping of L unit instructions (movl), because it would complicate the algorithm, and L units are not likely to have interdependencies.

Once we've determined the new order, we recompute the dependency vector. Note that the dependency vector was previously expressed in terms of the reorderMap, not the slot indices as recorded in the ReservationTable. We also adjust the must shift value to correspond to any reordering.

Finally, we walk through the stateInfo entries for the current FSMState, to determine whether there is an entry which satisfies the dependencies, must-shifts, and start slots. If so, we record the new state, and return.

4.5 MachineModel::rebuildState( )

The model and its associated finite state machine do not directly support unscheduling instructions. Instead, the state must be built up from the remaining instructions. To support this, the model provides a member function, MachineModel::rebuildState( ) which reconstructs the state after an instruction is removed.

The arguments to MachineModel::rebuildState( ) are as follows:

- MachineState curState: The current state (including dependencies, must-shifts, etc)
- IssueUnit*issueUnits: An array (MaxSlotCount in size) of issue units, indexed by their original slot index.
- DependencyVector newDependencies: The dependency vector as recomputed after removing the unscheduled instruction from the canonical order.
- Order reorderMap: the reorderMap, which will be updated with the new reordering if the update parameter is TRUE.
- Boolean update: TRUE iff the reorderMap should be updated.

The state is rebuilt by first ignoring the dependency vector, must-shifts and start slots, and obtaining the new FSMState. The original canonical ordering of instructions is preserved, to respect any existing intra-cycle dependencies among instructions of the same template issue unit, and to ensure that the caller-provided dependency vector (newDependencies) remains valid.

MachineModel::getNewState( ) is for this purpose called (once per non-NoIssueUnit entry in the issueUnits array), which incidentally will build a new reorderMap.

Finally, we search through the associated stateInfo entries (sub-states) to see whether there is one which satisfies the dependency, must-shift and start slot requirements.

5 ReservationEntry class

The ReservationEntry holds the instructions and associated information for a single cycle in the ReservationTable. Its fields are as follows:

MachineState state: The MachineState, as described in section 4.

IssueUnit issueUnits[MaxSlotCount]: An array containing the issue unit for the instruction in each slot index.

Instruction*slotMap[MaxSlotCount]: An array containing the actual instruction scheduled in each slot index.

PseudoEntryList pseudoEntries[MaxSlotCount]: An array containing a list of pseudo-instructions for each slot index. Pseudo instructions are only used by the code generation and optimization. They do not correspond to an actual instruction. Thus, they do not require an issue unit, and can be placed anywhere in the issue group. However, they may have ordering dependencies relative to other instructions, and so their position must be tracked at the time they are selected. These instructions are issued after the non-pseudo instruction in the corresponding slot.

PseudoEntryList firstPseudoEntries: The list of pseudo-instructions to be issued before any non-pseudo instructions (i.e. at the beginning of the cycle)

UInt8 instCount: The number of non-pseudo instructions currently scheduled in this cycle.

Slot mustBeFirst: The slot of the instruction, if any, which must be first (its value is InvalidSlot if there is no such instruction).

Slot mustBeLast: The slot of the instruction, if any, which must be last (its value is InvalidSlot if there is no such instruction).

Order reorderMap: The reservation entry reorderMap (which is a different data record from the state reorder map but has the same structure) maps from schedule order (i.e. slotMap order) to the instruction order for the current state. Note that the DependencyVector and the issueUnits correspond to the reordered positions. So, if reorderMap[0] is 3, that means that the first instruction scheduled is in slot 3 for this state.

The ReservationEntry members are public, and it is primarily manipulated by the ReservationTable. The only member function is for unscheduling.

5.1 ReservationEntry::unschedule( )

The arguments to Reservation Entry::unschedule( ) are as follows:

const MachineModel*machineModel: The current MachineModel (a member of ReservationTable, but not of ReservationEntry)

UInt slotIndex: the slot index of the instruction to be unscheduled

This member function first recomputes the dependency vector, by simply calling deleteDependencies (see section 4.2). Next, it constructs the array of issue units as required by MachineModel::rebuildState( ) (see section 4.5), setting the issue unit for the deleted slot index to NoIssueUnit. It then either sets the state to InitialState (if this was the only instruction in the cycle), or calls MachineModel::rebuildState( )

6 ReservationTable Classes

6.1 Base ReservationTable Class

The meat of the ReservationTable implementation is in the member function ReservationTable::canSchedule( ) which performs the work both for finding the next available slot for an instruction, as well as doing the actual scheduling.

6.1.1 ReservationTable::canSchedule( )

The arguments to ReservationTable::canSchedule ( ) are as follows:

Instruction &inst: the Instruction to be scheduled

Cycle when: the Cycle at which scheduling is being attempted

Slot early: the slot indices for those instructions which this instruction depends upon (and therefore must be issued earlier)

Slot late: the slot indices for those instructions which depend upon this one (and therefore must be issued later)

Boolean updateResTable: TRUE iff the instruction should be actually scheduled into the given cycle, if possible.

MachineState*newStatePtr: A pointer to a MachineState which is updated with the new state resulting from scheduling the instruction in this cycle (may be BadState if scheduling is unsuccessful).

The scheduling of pseudo-instructions, versus those that represent real instructions, is quite different, and described separately.

6.1.1.1 Scheduling Pseudo-Instructions

A pseudo instruction, whose issue unit will be NoIssueUnit, is appended to the pseudo-instruction list associated with a specific slot index. Here are the cases we need to handle:

If the early slot is EmptySlot, we will simply append the instruction to the firstPseudoEntries list in the ReservationEntry.

If the early slot has a single bit set, and if late is EmptySlot, then we schedule the instruction at <when,early> and append it to the pseudoEntries list for the slot index corresponding to early.

If the early slot has multiple bits set, we must select a fixed order for them, so that we can ensure the dependencies are satisfied when we associate this pseudo-instruction with just one slot index. We obtain the "final" ordering, and use that to determine the slot index to attach this to. (We need to attach it to the "early" slot that comes latest in the "final" ordering.) (Note that this ordering isn't really final, but we know it's a valid issue order). Next, we have to add dependency(s) between the other slots and the slot where we choose to position this pseudo-instruction. This may cause us to add new constraints. Since we've obtained this ordering from the stateInfoIndex, we know it's valid. Note that this implies two reorderings (one to get the canonical issue unit order, and another to get the actual template ordering for the state, as if we were going to issue the instructions now). While we're at it, we determine the "final" position of the "late" slots.

In the second or third case, we then incorporate the new dependencies (early and late) into the dependency vector. If all of the slots in "late" are after the selected slot in the "final order", then we're nearly done. However, if not, we have to try to reorder the instructions so that the "late" slots are all after the "early" slots. We then reorder the dependency vector, and must-shifts. Finally, we check out the stateInfo entries (sub-states) for the current FSMState, to see if we can find one to satisfy the new constraints.

Note that the actual appending of the pseudo-instruction to the appropriate list is done in ReservationTable::mapInst( ).

6.1.1.2 Scheduling "Real" Instructions

The "early" slot dependencies for a to-be-scheduled instruction are augmented with dependencies from the "must-be-first" instruction already scheduled, if any. If the new instruction is a "must-be-last" instruction, we set the "early" bits for all previously scheduled instructions.

Similarly, we augment the "last" slot dependencies with dependencies to the "must-be-last" instruction already scheduled, if any. If the new instruction is "must-be-first", we set the "late" bits for all previously scheduled instructions, and also set the possible start slots to zero. If the new instruction is a call, we set the "late" bit for the last branch in the cycle, if any. This is because the design requires that a conditional branch terminating a block must be the last instruction in the block.

The instruction will be scheduled at the next available slot index.

The MachineModel::getNewState( ) function is then called to determine whether the instruction can be scheduled, and if we are successful (and updateResTable is TRUE), we record the new state and save the slot if it's a "must-be-first" or "must-be-last" instruction.

6.1.2 ReservationTable::replaceInst( )

This member function is used to replace one instruction with another in the same cycle, and with the same dependencies. If the instruction is of the same issue unit type, it can be simply substituted. Otherwise, the old instruction is unscheduled, and the new instruction scheduled in its place. We save a copy the ReservationEntry before doing the unschedule, so that instead of rescheduling the old instruction if we're unsuccessful, we can simply restore the old ReservationEntry.

6.2 CycleReservationTable

The CycleReservationTable is derived from the base ReservationTable class. It is used by the list scheduler, scheduling only into the latest cycle. Only two cycles at a time are actually used: the last cycle scheduled and the one currently being scheduled. The previous cycle is retained in order to match up the end and start slots.

6.3 ModuloReservationTable

The ModuloReservationTable, also derived from the ReservationTable class, is used by the modulo scheduler, and models the wrapping of the pipelined schedule. Instructions are scheduled into the given cycle modulo the table size.

6.4 CycleLayoutIterator

The CycleLayoutIterator iterates through a specific cycle of the reservation table, returning each instruction in issue order, as well as a NullInstruction where a nop needs to be inserted. This method, and the following one, are used for the purposes of generating the actual instruction stream following instruction scheduling.

6.5 ReservationTableIterator

The ReservationTableIterator iterates through all cycles of the reservation table, returning each instruction in issue order, as well as a NullInstruction where a nop needs to be inserted. It uses the CycleLayoutIterator for each cycle.

6.6 InstToReplaceIterator

This class is used by the modulo scheduler when it needs to find an instruction to displace in order to schedule another instruction. Given an instruction, I, to be scheduled, along with its early and late times, it iterates through the possible instructions which if removed, would leave room for I. This allows the modulo scheduler to choose to displace the one that actually has some schedule freedom.

7. Generating Tables

The model utilizes the following generated tables that are target-independent (for a family of processors, with a maximum issue width among them of N):

The reordering table: this is a table of all possible reorderings of the N instructions that can be issued in a single cycle. At the time that they are generated, the allowable dependencies for each reordering are computed.

This information is not retained on a per-reordering basis, but is used to create the StateInfoTable 62 entries.

And the following generated tables that are target-dependent (i.e. there is a separate version of the table for each target processor):

The state transition table: this is indexed by current FSM (finite state machine) state and the functional unit being added, and contains the new FSM state. The functional unit types in the state transition table include all of the issue unit types (e.g. I0 and MS), even though the FSM states actually only track the "template types" (e.g. they include A, M, and I, but doesn't include I0 and MS). The table also indicates the position(s) in the canonical ordering into which the new functional unit may be inserted.

A table mapping FSM state 60 to StateInfoIndex 61. The StateInfoIndex is shown in FIG. 6. This enables lookup of the StateInfoTable entries associated with the current state, to verify whether any match the current constraints (dependencies, supplemental instructions, and possible starting slots).

The StateInfoTable 62. The StateInfoTable is shown in FIG. 6. This table contains a variable number of entries 64-66 per FSM state (indexed by the StateInfoIndex), each of which describes a valid combination of dependencies, supplemental instructions and starting slot for the given FSM State. It also includes the reordering required to place the instructions into the target template, along with the target templates for the possible ending slot positions.

As shown in FIG. 7, the dependencies are expressed as a vector of N*N bits, where N is the number of instructions issued per cycle. The least significant N bits express the allowable dependencies for the first (left-most) instruction, the next N bits express the allowable dependencies for the next instruction, and so on. Within each N-bit sub-vector, the most significant bit indicates a dependence on the first (left-most) instruction, and so on, with the least significant bit of each N-bit sub-vector indicating a dependence on the last (right-most) instruction. For example, for a machine with six issue slots indicated by I0 through I5, left-to-right, the following vector (illustrated in octal so that the six-bit sub-vectors can be easily distinguished) indicates the maximum allowable dependencies: 371707030100. Note that the least significant 6 bits are zeros, because I0 cannot be dependent on any of the subsequent instructions, and the most significant 6 bits have all but the most significant bit set, because I5 can be dependent on any of the other instructions (but not on itself).

The method used to generate these tables is described below.

7.1 Target-Independent

7.1.1 Prerequisites

The following information is supplied to the generator tool:

An ordered list of issue units, which obeys the following constraints:

All supplemental issue unit types precede the corresponding, more restricted, issue unit type. For example, I0 must precede I.

All more-generic issue unit types follow the corresponding issue unit type. For example, A must come after both M and I, and M must follow both MS and ML (specialized memory units' which can only execute a store and load respectively).

Note that this is actually target-dependent, in that some issue unit types may only exist on a given implementation of the architecture, but the overall framework must use a consistent set of issue unit types, so we must use the union of all issue unit types that exist on any supported target processor.

A specification of which issue unit types are satisfied by alternate issue unit types in the templates (e.g. an A unit is actually satisfied by either an M or I unit)

7.1.2 Reordering Table

As shown in FIG. 7, this is an array of length N arrays, where N is the number of instructions issued per cycle. The possible reorderings are enumerated through the following method:

```
M = 2
Reorderings[0] = {0,1,...,N}
Dependencies[0] = { ((1<<(N-1))-1)<<(N-1)*N,
    ((1<<(N-2))-1)<<(N-2)*N,
    ..., 3<<(2*N), 1<<N, 0 }
NextIndex = 1;
for i = 2 to N {
  prevCount = nextIndex
  for j = i-2 to 0 by -1
    copy all of the reorderings from 0 to prevCount, into the next
    available Reorderings, beginning with nextIndex, and replacing any
    number n, j <= n < i-2, with j + 1, and placing j in the i-1 position
    compute the dependency vector for each reordering, and save it in its
    corresponding Dependencies entry
```

When finished, the Reorderings in the table have the following property:

The reorderings for M instructions (where M<=N) are contiguous beginning with the zeroth index.

7.2 Target-Dependent
7.2.1 Prerequisites
The following information is supplied to the generator tool:

A specification of the templates supported by the target processor. For example, a McKinley (Itanium 2) processor, would include MMIMMI in this list, while the Itanium processor would not support this template. Note that these templates incorporate two constraints: the number of functional units of each issue unit type that exist in the processor, as well as any constraints on the order in which they may be specified. The order in which the templates are specified is significant in the following ways:

The templates are ordered first in ascending order of size. Note that, for the IPF architecture, instructions are actually packaged in "bundles" of 3 instructions. There are only two instruction templates that include a cycle-break in the middle of a bundle (MI;I and M;MI, where the ';' indicates where the cycle break occurs). This means that it is frequently necessary to issue a full bundle, even if only one or two instructions are present. Thus, in the situation where the current cycle can utilize a partial bundle remaining after the previous cycle, this is considered "smaller" in size than a template that begins at a bundle boundary, since the space would otherwise remain unused. Thus, if we have two M instructions that need to be issued, the template XMIMXX (where 'X' indicates an unused slot, due to use of partial bundle templates) would be considered "smaller" than MMI, since, although the latter uses only a single bundle, it fills it completely, while the former uses a partial bundle from a previous cycle, plus only one of the instructions in the second bundle, allowing for the possibility of the next cycle using the remaining instructions in the bundle.

They are ordered next by their desirability, in terms of cross-platform performance and other factors.

The order must preserve the property that a given ordering of issue slots will be satisfied in the same slot positions for all possible ending slots.

The maximum number of each type of "supplemental" instruction that can be issued in a single cycle.

7.2.2 Enumerate the Valid FSM States

This involves simply enumerating the valid FSM states by checking all possible combinations of template issue units (referred to as a "layout") against the templates supported for the target processor. The layouts are enumerated in such a way that the constituent issue units always appear in the layout in canonical order, as specified in section 7.0 above. If a template exists that contains all of the issue units in the given layout, then that layout represents a valid state, and a new FSM state is created for it.

7.2.3 Enumerate the FSM State Transitions

For each <state, issue unit> pair, determine whether the issue unit can be added to the given state to produce a valid new state, as follows: Insert the issue unit in the appropriate location(s) to preserve canonical ordering, and then search the valid FSM states to see if it exists. Note that the state transition table includes the first and last positions into which the issue unit can be inserted into the existing layout. For issue unit types that are not included in the state layouts (e.g. I0, MS, ML), they may only be specified in the first N indexes of the associated template unit (I, M, and M respectively for I0, MS, and ML), where N is the total number of the associated functional units available on the target processor. If so, add this transition to the state transition table.

7.2.4 Generate the StateInfo

For each state, determine the conditions (dependency vector, supplemental instruction locations, and possible start slots) that it may support. Note that there may be multiple entries per state, as shown in FIG. 6, because they may support different dependencies, or additional supplemental instructions, or be more compact than another. This is accomplished by the following method (for each FSM state):

For each possible reordering
  If it doesn't preserve the original order of same-type units, then continue
  For each possible starting slot
    For each possible combination of "supplemental" instructions for this FSM State
      Check to see whether there's a template that matches it, in the given reordering
      If not, continue to the next combination
      compute a new reordering (the matching FSM state must have the issue units in the given order, but there may be additional units interspersed)
      compare this template and associated dependencies (associated with the current reordering), supplemental instruction locations, and size, with all previous templates found for this state.

If it is better in all respects than a previously saved template
        replace the previously saved one with the current one
    If it is better in at least one respect than all previously saved templates
        add this template to the saved templates
    otherwise, continue
Sort the templates first by size, then by template number (the original order of the templates, see section 7.2.1 above). Record them in the stateInfoTable, along with the associated dependencies, supplement instruction locations, possible starting slots, reorder index, and template number(s) (one template number for each possible ending slot position).

8. Three Examples of Instruction Scheduling

The examples illustrate three types of instruction scheduling for a simple loop body.

All three examples implement the following source code:
```
int
foo (int a[ ], intb[ ])
{
  int I, result;
  result=0;
  for(I=0; I<100; ++I) {
    result+=(a[i]+b[i])<<10
  }
  return result;
}
```

The dependency graph shown in FIG. 5 applies to the list scheduling, but is also applicable to modulo scheduling, though in the latter case there would sometimes be extra edges if there were cross-loop dependencies. Those don't really factor into this example, so the graph can be applied to both. It shows all of the instructions in the block, along with their dependencies and the associated latency (how many cycles must elapse between one instruction and the dependent instruction). The latencies appear as numerical annotations on the graph edges.

FIGS. 8-11 generally show the reservation table after each instruction is scheduled for each of the three examples, labeled Sample 1, Sample 2, and Sample 3. The various fields comprising the machine state are shown. Note that the dependency vector is represented as six digits, but this is not its actual representation. The dependencies are actually represented as a 36 bit mask, each six bits representing the dependencies of one of the six instructions. The reservation entry reorder map, on the other hand, is represented as an array of integers.

In all cases, once a cycle has been scheduled, we find the final instruction template (e.g. MMIMFB) from the FSM State and the stateInfoIndex. The latter isn't mentioned in the examples, because it really represents the reorder and must-shift information, along with the possible starting slots. It also indicates the additional reordering that must be done (relative to the canonical order) to produce the final template.

8.1 List Scheduling:

FIG. 8. The instruction scheduler schedules one cycle at a time, from a set of candidates that are ready to be scheduled (i.e. their predecessors have all been scheduled, and any latency between them has "elapsed"). For this type of scheduling, in this generic example, we really only need to maintain one entry in the reservation table. (For the specific case of Inatium, we need two entries because we don't know for sure what the "end slot" will be on one issue group until we have determined what "start slots" are possible for the next one, which we won't know until we're done selecting its instructions.) The entry is initialized to the "INITIAL" state (see Sample 1) before each cycle is scheduled. Note that the INITIAL state is mostly zeros, but the reorder map indicates a left-to-right ordering, and the issue unit count is non-zero, because it is designed to enable the detection of overflow by the use of a simple mask. See section 4.1 above.

The first instruction, an Id4, is scheduled into cycle 0. Its issue unit type is ML. This issue unit type is not a "template" type, but is a specialization of M. It is not tracked as a "must-shift", however, because it doesn't have to be issued in any particular order relative to other "M" type instructions. So, the new FSM state is 283, which represents just "M". The reorder map and dependency vector remain the same, as there is just one instruction, and therefore there can be no dependencies, or mismatch with the canonical ordering. The issue unit count changes from 0x90 (the initial state) to 0xa0, because one ML has been scheduled and we have a defined constant "MLMap", which is associated with this opcode, and whose value is 0x10.

The next instruction, another Id4, is also scheduled into cycle 0. Its issue unit type is also ML. The new FSM state is 284, which represents "MM". This instruction has no dependencies on the first, and there is no reordering required for the canonical ordering, so the only other change is that we add another 0x10 to the issue unit count, resulting in the new value of 0xb0.

The Ifetch cannot be issued, because it is also an ML issue unit type. So, even though we can generate a valid FSM state by adding another "M" (to make "MMM", which is state 285, we would then have to add another 0x10 to the issue count, making 0xc0, in which the 0x40 bit is set, which signals an overflow. The add, although its predecessors have been scheduled, is not yet ready, because it has latency 1 dependency edges from the loads.

So, we start a new cycle (cycle 1), re-initializing our reservation table entry to the INITIAL state, and then we schedule the add. This instruction is an "A" issue unit type, resulting in state 495 ("A"). No other fields change.

Then, we schedule the (fetch into the same cycle, which is an "ML" issue unit type. This gives us the new FSM state of "MA", and a new issue unit count of 0xa0. Note that the reorder map now must change, since the canonical order of the FSM state is "MA", but our instructions have been scheduled in the opposite order.

We then issue another add, changing the FSM state to 401 ("MAA") and adding a bit in the dependency vector, since this add can only be issued after the Ifetch (though note that the latency of zero allows it to be scheduled in the same cycle).

The next cycle (cycle 2) we issue only a dep.z. This is an "I0" issue unit type, which results in FSM state 1 (I), and a value of 1 in the "must shift" column. This isn't a terribly interesting example, since nothing else goes into the same cycle, but it's worth mentioning here that the instructions are put into canonical order (and the reorder map is constructed) by putting them into ascending order by "actual" issue unit type, rather than by "template" issue unit type. This means that the I0 instruction will always occupy the left-most position among any other I instructions, and will therefore be put into the leftmost "I" slot in the associated instruction template once the full cycle has been scheduled.

For the final cycle, we schedule an add and then a branch. The only interesting thing to note is that the branch must be scheduled after the add, so note the 1 in the second position of the dependency vector. The second position is actually the position corresponding to the add, since the dependency vector is according to canonical ordering. The value of 1 indicates a dependence on the branch, which is in the first position.

8.2 Modulo Scheduling:

FIG. 9. In modulo scheduling, we are attempting to schedule the instructions into a pipelined schedule with a fixed initiation interval (ii). The initiation interval dictates the size of the reservation table. In this case, we're attempting to schedule with an ii of 2, so we need only 2 entries. We start with both entries set to the INITIAL state.

We first schedule the branch into the last entry of the table. It's always the last instruction. We can schedule it as the first instruction in the last entry, however, because the machine model will ensure that the branch is last. This gives us a state of 612 in the FSM state for cycle 1, which corresponds to "B".

We then schedule two loads into cycle 0. This is just like the previous sample.

We then schedule an add in cycle 1. Because it's an "A" issue unit type instruction, and the new state is "AB" (583), the reorder map is updated appropriately.

Next, we schedule a dep.z. It is scheduled at cycle 2 in the effective schedule, but because this is modulo scheduled, that wraps to be the same as cycle 0. So, we now have state 87 (IMM), and a must-shift of 1. The reorder map is updated.

Next, we schedule an add in cycle 1, and it is dependent on the Ifetch, which is in the first position in canonical order, while the add goes into the third position (MAAB). So, the third position of the dependency vector shows a dependence on the first position.

We then schedule an add in cycle 3, which is the same as cycle 1. We now have MAAAB (415), and the reorder map is updated.

8.3 Operation Scheduling:

See FIGS. 10a and 10b. In this scheduling method, we schedule multiple cycles at once. Each instruction, as it is scheduled, is placed into the earliest cycle at which it is ready. In our case, we use this for non-optimized code, as it doesn't require that we build a dependency graph (which is expensive). We simply track what registers are live, and do very simple tracking of memory locations. Because this is supporting unoptimized code, we don't allow instructions to be scheduled across statement boundaries, to allow full support of debugging. Our example isn't really very interesting, since the code doesn't exhibit much parallelism (note that the actual instructions are different in this case because they haven't been optimized prior to scheduling).

In operation scheduling, we maintain a window of cycles, and when we need to schedule an instruction into a cycle which is later than the bottom of our window, we close out enough cycles at the top of the window to allow it to be scheduled. (When we close out those cycles, we actually emit the associated instructions into the instruction stream). In our example, we show 7 cycles, since that's all that's needed, but in our actual scheduler we use a window of 32 cycles.

There's nothing really new in this case. The instructions are scheduled in the order that they appear in the incoming instruction stream. One thing worth noting is that there are seemingly extraneous dependencies due to the restriction that instructions cannot cross statement boundaries. Also, there are some conservative assumptions regarding memory dependencies (memory instructions aren't reordered, so the two loads appear to have a dependency, even though they do not). In cycle 5, the adds have a dependency, because they are associated with different source statements.

9. Example of Rescheduler Showing Use of Pseudo-Instructions

See FIG. 11. This is an example of the function of the rescheduler, which is simply a list scheduler that runs after register allocation (the main instruction scheduling is done prior to register allocation). It shows the instructions selected for a single cycle, and illustrates the use of pseudo-instructions, and also shows the values of the stateInfoIndex and possibleStartSlots at each step (which have been omitted from previous examples). However, the pseudoEntries lists are omitted, as they are not needed for this example.

The first instruction selected for scheduling is an EntryOp. This is a pseudo-instruction, and, since it had no early dependencies within the cycle, it goes into the firstPseudoEntries list. The FSMState remains 0, as do most of the other fields in MachineState. Note, however, that the "count" field (which is the issueUnitCount field of the MachineState) is already at hex 90. This corresponds to a 1 in each of the M2 and M3 maps. This is initialized in this manner, since the overflow count for each of these types is 3, but we need it to be a power of 2 so that we can do a simple mask check. So, if we start with 1, we'll overflow at 4 (which corresponds to hex 240).

We then schedule an add instruction. This is an A type instruction, and FSMState 495 corresponds to a single A. The stateInfoIndex is 3070, which indicates templates 32 (MII), 4 (M;), and 5 (MI;) for end slots of 0, 1, and 2 respectively. (Note that the stateInfoTable is not shown).

We then schedule an alloc instruction. This is an M2 type instruction, and FSMState 400 corresponds to MA (M2 is not a template type). The stateInfoIndex is 2465, which indicates templates 32 (MII), NoTemplate, and 5 (MI;) for end slots of 0, 1, and 2 respectively. The mustShift field (ms) is 1, indicating that we have a must-shift instruction in the first position of the canonical ordering. The reorderMap shows that we swap the add and alloc to get the canonical ordering, and the dependencies show that the add depends on the alloc (note that the dependency vector is also in canonical order, so the first position corresponds to the alloc). The count field (issueUnitCount) goes to hex 94, since we've added an M2 type instruction.

We then schedule a mov rp instruction. This is an I0 type instruction, and FSMState 145 corresponds to IMA (I0 is not a template type). The stateInfoIndex is 907, which indicates templates 32 (MII), NoTemplate, and NoTemplate for end slots of 0, 1, and 2 respectively. This indicates that there are no templates that would accommodate an end slot of 1 or 2. The mustShift field (ms) is 3, indicating that we have must-shift instructions in the first and second positions of the canonical ordering. The reorderMap shows the positions of the first three instructions are reversed to get the canonical ordering, and the dependencies show that the add and mov depend on the alloc.

After scheduling two more A-type adds, the FSMState is 145, which corresponds to IMAAA. The stateInfoIndex is 943, which shows templates 60 (MMIMIH), NoTemplate, and 53 (MMIMI;) for end slots of 0, 1, and 2 respectively, which indicates that an end slot of either 0 or 2 could be accommodated. The mustShift and count fields haven't changed, and we've simply added dependencies from the alloc to the new instructions.

CONCLUSION

While specific embodiments of the invention have been disclosed, many other embodiments are possible. The scope of the invention is to be defined by the following claims and not limited by the details described above.

I claim:

1. A computer method using a computer model for compiling a set of instructions for a processor which can process at least two instructions in a cycle, the method comprising:
   a. selecting, from a set of instructions, a first instruction and a second instruction to be issued to the processor in an issue group;
   b. generating dependency data reflecting dependencies between the first and second instructions;
   c. determining whether the dependency data, in any possible order of the instructions, satisfies the model;
   d. if the dependency data satisfies the model, proceeding to step (e) and, if not, rejecting the second instruction, selecting an alternate second instruction from the set of instructions, and returning to step (c); and wherein the method further comprises between steps (d) and (e):
      (d1) storing the dependency data for the first and second instructions in a memory;
      (d2) selecting a third instruction from the set of instructions;
      (d3) reading the dependency data from the memory and updating the dependency data to reflect dependencies between the first, second, and third instructions;
      (d4) determining whether the dependency data, in any possible order of the instructions, satisfies the model;
      (d5) if the dependency data satisfies the model, proceeding to step (e) and, if not, rejecting the third instruction, selecting an alternate third instruction from the set of instructions, and returning to step (d3)
   e. reordering the instructions in the issue group to an order that satisfies the model, wherein the relative order of instructions in the issue group to be executed within a cycle of the processor affects a function of the processor.

2. The method of claim 1 wherein the dependency data is stored as vector comprising a set of bits for each slot of an issue width, each set of bits comprising a number of bits equal to the issue width.

3. The method of claim 2 wherein each determination whether the dependency data, in any possible order of the instructions, satisfies the model is made by applying a bit mask to the set of bits for each slot.

4. The method of claim 1 further comprising, between steps (d) and (d2): storing a reorder map data record information specifying an order for the first and second instructions relative to a canonical order.

5. The method of claim 4 wherein step (e) comprises consulting the reorder map data record to determine the order that satisfies the model.

6. A non-transitory computer readable medium storing a compiler computer program which, when run on a computer, performs a method using a computer model for compiling a set of instructions for a processor which can process at least two instructions in a cycle, the method comprising:
   a. selecting, from a set of instructions, a first instruction and a second instruction to be issued to the processor in an issue group;
   b. generating dependency data reflecting dependencies between the first and second instructions;
   c. determining whether the dependency data, in any possible order of the instructions, satisfies the model;
   d. if the dependency data satisfies the model, proceeding to step (e) and, if not, rejecting the second instruction, selecting an alternate second instruction from the set of instructions, and returning to step (c); and
   e. reordering the instructions in the issue group to an order that satisfies the model, wherein the relative order of instructions in the issue group to be executed within a cycle of the processor affects a function of the processor; and
   f. only after all instructions for the issue group have been selected and reordered, scheduling the instructions for execution by the processor.

7. A non-transitory computer readable medium storing a compiler computer program which, when run on a computer, performs a method using a computer model for compiling a set of instructions for a processor which can process at least two instructions in a cycle, the method comprising:
   a. selecting, from a set of instructions, a first instruction and a second instruction to be issued to the processor in an issue group;
   b. generating dependency data reflecting dependencies between the first and second instructions;
   c. determining whether the dependency data, in any possible order of the instructions, satisfies the model;
   d. if the dependency data satisfies the model, proceeding to step (e) and, if not, rejecting the second instruction, selecting an alternate second instruction from the set of instructions, and returning to step (c), and wherein the method further comprises, between step (d) and a step (e):
      (d1) storing the dependency data for the first and second instructions in a memory;
      (d2) selecting a third instruction from the set of instructions;
      (d3) reading the dependency data from the memory and updating the dependency data to reflect dependencies between the first, second, and third instructions;
      (d4) determining whether the dependency data, in any possible order of the instructions, satisfies the model;
      (d5) if the dependency data satisfies the model, proceeding to step (e) and, if not, rejecting the third instruction, selecting an alternate third instruction from the set of instructions, and returning to step (d3); and
   e. reordering the instructions in the issue group to an order that satisfies the model, wherein the relative order of instructions in the issue group to be executed within a cycle of the processor affects a function of the processor.

8. The computer readable medium of claim 7 wherein the dependency data is stored as vector comprising a set of bits for each slot of an issue width, each set of bits comprising a number of bits equal to the issue width.

9. The computer readable medium of claim 8 wherein each determination whether the dependency data, in any possible order of the instructions, satisfies the model is made by applying a bit mask to the set of bits for each slot.

10. The computer readable medium of claim 7 wherein the method further comprises, between steps (d) and (d2): storing in a reorder map data record information specifying an order for the first and second instructions relative to a canonical order.

11. The computer readable medium of claim 10 wherein step (e) comprises consulting the reorder map data record to determine the order that satisfies the model.

12. A computer system comprising a processor for compiling a computer program, and further comprising:
   a. means for selecting, from a set of instructions, a first instruction and a second instruction to be issued to a processor in an issue group;
   b. means for generating dependency data reflecting dependencies between the first and second instructions;
   c. means for determining whether the dependency data, in any possible order of the instructions, satisfies the model;

d. means for, if the dependency data satisfies the model, proceeding to step (e) and, if not, rejecting the second instruction, selecting an alternate second instruction from the set of instructions, and returning to step (c); and the system further comprising, between steps (d) and (e):
   (d1) means for storing the dependency data for the first and second instructions in a memory;
   (d2) means for selecting a third instruction from the set of instructions;
   (d3) means for reading the dependency data from the memory and updating the dependency data to reflect dependencies between the first, second, and third instructions;
   (d4) means for determining whether the dependency data, in any possible order of the instructions, satisfies the model;
   (d5) means for, if the dependency data satisfies the model, proceeding to step (e) and, if not, rejecting the third instruction, selecting an alternate third instruction from the set of instructions, and returning to step (d3); and e. means for reordering the instructions in the issue group to an order that satisfies the model, wherein the relative order of instructions in the issue group to be executed within a cycle of the processor affects a function of the processor.

13. The system of claim 12 wherein the dependency data is stored as vector comprising a set of bits for each slot of an issue width, each set of bits comprising a number of bits equal to the issue width.

14. The system of claim 13 wherein each determination whether the dependency data, in any possible order of the instructions, satisfies the model is made by applying a bit mask to the set of bits for each slot.

15. The system of claim 12 further comprising, between steps (d) and (d2): storing in a reorder map data record information specifying an order for the first and second instructions relative to a canonical order.

16. The system of claim 15 wherein step (e) comprises consulting the reorder map data record to determine the order that satisfies the model.

* * * * *

UNITED STATES PATENT AND TRADEMARK OFFICE
CERTIFICATE OF CORRECTION

PATENT NO.        : 8,141,068 B1
APPLICATION NO.   : 10/175267
DATED             : March 20, 2012
INVENTOR(S)       : Carol L. Thompson Page 1 of 1

It is certified that error appears in the above-identified patent and that said Letters Patent is hereby corrected as shown below:

In the Claims:

In column 21, line 44, in Claim 4, after "storing" insert -- in --.

Signed and Sealed this
Sixth Day of August, 2013

Teresa Stanek Rea
*Acting Director of the United States Patent and Trademark Office*